(12) United States Patent
Iwasa (10) Patent No.: US 9,015,900 B2
(45) Date of Patent: Apr. 28, 2015

(54) DEVICE FOR INDICATING AMOUNT OF COLLECTED DUST, AND ELECTRIC CLEANER WITH SAME

(75) Inventor: Tooru Iwasa, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 139 days.

(21) Appl. No.: 13/814,438

(22) PCT Filed: Sep. 21, 2011

(86) PCT No.: PCT/JP2011/005297
§ 371 (c)(1),
(2), (4) Date: Feb. 5, 2013

(87) PCT Pub. No.: WO2012/042789
PCT Pub. Date: Apr. 5, 2012

(65) Prior Publication Data
US 2013/0133154 A1    May 30, 2013

(30) Foreign Application Priority Data

Sep. 27, 2010 (JP) ................................. 2010-214881

(51) Int. Cl.
*A47L 9/19* (2006.01)
*G01D 13/22* (2006.01)
*A47L 5/36* (2006.01)

(52) U.S. Cl.
CPC . *A47L 9/19* (2013.01); *G01D 13/22* (2013.01); *A47L 5/362* (2013.01)

(58) Field of Classification Search
CPC ....... A47L 9/19; A47L 9/2857; A47L 9/2842; A47L 9/02; G01D 13/22

USPC ............ 15/339, 319; 116/327, 328, 268, 271, 116/274, 276, DIG. 2
See application file for complete search history.

(56) References Cited

U.S. PATENT DOCUMENTS

| 4,020,525 A | * | 5/1977 | Fromknecht et al. | ........... 15/339 |
| 4,060,050 A | * | 11/1977 | Simonsson | .................... 116/268 |
| 4,100,878 A | * | 7/1978 | Leinfelt | ........................ 116/268 |

(Continued)

FOREIGN PATENT DOCUMENTS

| JP | 52-083371 U | 6/1977 |
| JP | 55-167352 U | 12/1980 |
| JP | 59-016548 U | 2/1984 |

(Continued)

OTHER PUBLICATIONS

International Search Report for International Application No. PCT/JP2011/005297, dated Dec. 27, 2011, 2 pages.

*Primary Examiner* — Dung Van Nguyen
(74) *Attorney, Agent, or Firm* — Brinks Gilson & Lione (57) ABSTRACT

Collected-dust-amount indicating device (16) includes a pointer tube, at least a part of which is configured with a transparent material. The pointer tube includes a first end portion to which a first pressure is applied, and a second end portion to which a second pressure is applied. In the inside of the pointer tube, a pointer is disposed which is displaced by a differential pressure between the first pressure applied to the first end portion and the second pressure applied to the second end portion. Moreover, a pointer spring is disposed to be accommodated in the pointer tube such that the pointer spring biases the pointer toward larger one of the first pressure and the second pressure.

9 Claims, 7 Drawing Sheets

(56) References Cited

U.S. PATENT DOCUMENTS 5,778,486 A * 7/1998 Kim ............................. 15/339
5,829,093 A * 11/1998 Kim ............................. 15/339

FOREIGN PATENT DOCUMENTS

| JP | 01-277526 A | 11/1989 |
| JP | 08-196488 A | 8/1996 |

* cited by examiner

DEVICE FOR INDICATING AMOUNT OF COLLECTED DUST, AND ELECTRIC CLEANER WITH SAME

This application is a 371 application of PCT/JP2011/005297 having an international filing date of Sep. 21, 2011, which claims priority to JP2010-214881 filed Sep. 27, 2010, the entire contents of which are incorporated herein by reference.

TECHNICAL FIELD

The present invention relates to collected-dust-amount indicating devices and to electric vacuum cleaners that are equipped with the devices.

BACKGROUND ART

Figure 6:
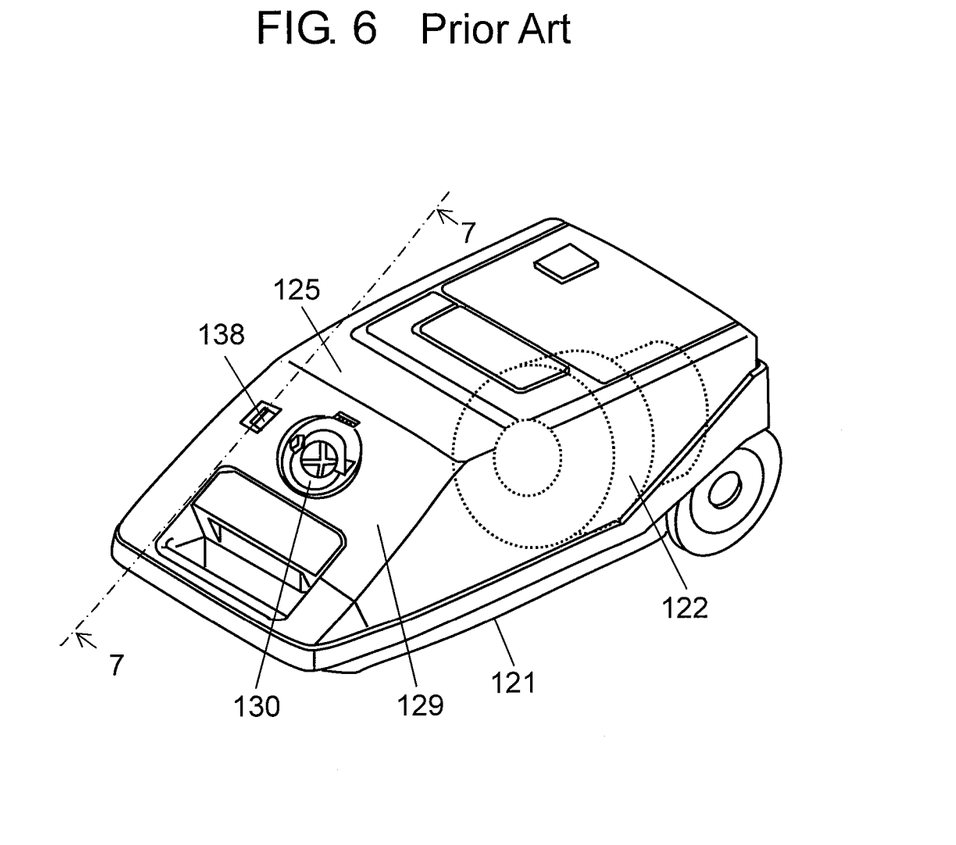
FIG. 6 is a perspective view of a vacuum cleaner body equipped with a conventional collected-dust-amount indicating device.
Figure 7:
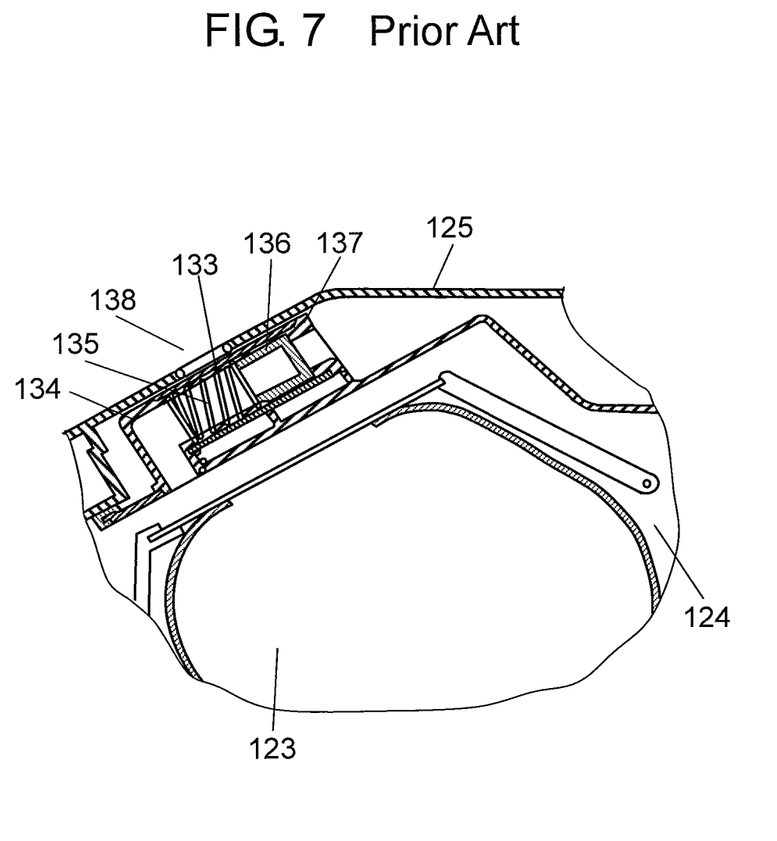
FIG. 7 is a cross-sectional view of the vacuum cleaner body shown in FIG. 6, taken along line 7-7.

Conventionally, in an electric vacuum cleaner, configurations have been proposed in which a collected-dust-amount indicating device is disposed therein for notifying a user of a timing of replacing its paper bag (see Patent Literature 1, for example). FIG. 6 is a perspective view of a vacuum cleaner body having a conventional collected-dust-amount indicating device. FIG. 7 is a cross-sectional view of the vacuum cleaner body, taken along line 7-7 of FIG. 6. As shown in FIGS. 6 and 7, in the conventional electric vacuum cleaner, electric vacuum cleaner body 121 includes motor 122 and dust collection chamber 124 in which paper bag 123 is attached. Moreover, the conventional electric vacuum cleaner includes lid 125 that covers an upper opening of dust collection chamber 124.

In lid 125, inclined surface 129 is formed that inclines downward from a horizontal surface. In inclined surface 129, suction port 130 is disposed. A hose (not shown) is coupled detachably with electric vacuum cleaner body 121 via suction port 130. In addition, in a vicinity of suction port 130 in the inside of lid 125, transparent pipe 133 and indicator elbow 134 are attached. Transparent pipe 133 accommodates coil spring 135, tube body 136, and cap 137. Transparent pipe 133 communicates with dust collection chamber 124 via indicator elbow 134. An indicator (collected-dust-amount indicating device 16) is configured with transparent pipe 133 and indicator elbow 134.

With the above configuration, pressure in dust collection chamber 124 decreases as paper bag 123 accumulates dust. Tube body 136 moves in accordance with a relation of the elastic force of coil spring 135 to a difference in pressure between the atmospheric pressure and the pressure in the inside of dust collection chamber 124. Then, tube body 136 moves to reach the position of window 138 disposed in inclined surface 129 of lid 125, which can notify the user of the timing of replacing paper bag 123.

In conventional electric vacuum cleaners, since no examination has been made of component commonality of collected-dust-amount indicating devices among different types of vacuum cleaners, there may be a problem of higher manufacturing costs of the electric vacuum cleaners.

That is, there is the need for customizing each of the designs of the collected-dust-amount indicating devices, depending on a dust collecting system of the electric vacuum cleaner, an appearance configuration of the electric vacuum cleaner body, an arrangement position of the device, and the like. For this reason, manufacturing costs of the electric vacuum cleaners may increase.

In addition, there is the need for preparing customized metal molds of each of the collected-dust-amount indicating devices, with the each having a customized design depending on the dust collecting system of the cleaner, the appearance configuration of the cleaner body, the arrangement position of the device, and the like. This may result in increased manufacturing costs of the electric vacuum cleaners.

Patent Literature 1: Japanese Patent Unexamined Publication No. H01-277526

SUMMARY OF THE INVENTION

The present invention is intended to provide a collected-dust-amount indicating device and an electric vacuum cleaner equipped with the device, which are capable of providing commonality of their components among electric vacuum cleaners different from each other in dust collecting systems of the cleaners, appearance configurations of the cleaner bodies, arrangement positions of the devices, and the like.

The collected-dust-amount indicating device according to the invention includes a pointer tube, at least a part of which is configured with a transparent material. The pointer tube has a first end portion to which a first pressure is applied and a second end portion to which a second pressure is applied. Moreover, the device includes a window part disposed in a side surface of the pointer tube, and a pointer accommodated in the pointer tube. The pointer is displaced by a difference in pressure between the first pressure and the second pressure. Furthermore, the device includes a pointer spring accommodated in the pointer tube. The pointer spring biases the pointer toward larger one of the first pressure and the second pressure. The pressures, applied to the first end portion and the second end portion of the pointer tube, are changeable by changing attachment positions of the pointer and the pointer spring.

With the collected-dust-amount indicating device and the electric vacuum cleaner equipped with the device according to the invention, it is possible to select, in the pointer tube, either the position of the portion to which a negative pressure is applied or the position of the portion to which atmospheric pressure is applied, by changing the attachment positions of the pointer and the pointer spring. Accordingly, it is possible to provide the commonality of the components of the collected-dust-amount indicating devices among the electric vacuum cleaners which differ from each other in the dust collecting systems of the cleaners, the appearance configurations of the cleaner bodies, the arrangement positions of the devices, and the like. In addition, this allows a reduction in manufacturing costs of the electric vacuum cleaners.

DETAILED DESCRIPTION OF THE PREFERRED EMBODIMENTS

First Exemplary Embodiment

A first embodiment will be described in detail hereinafter, with reference to the accompanying drawings.

Figure 1:
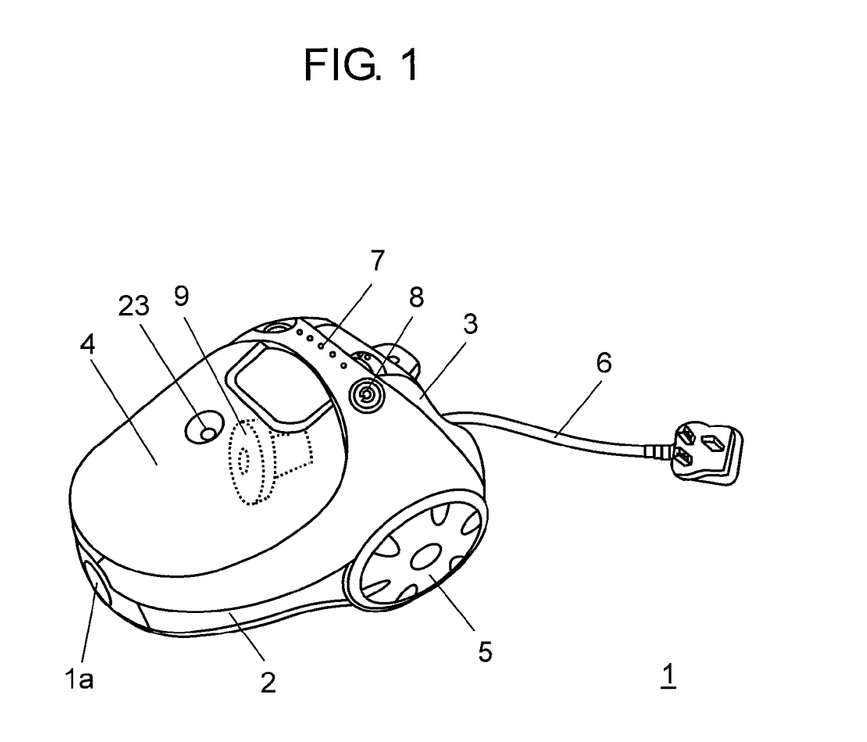
FIG. 1 is a perspective view of a vacuum cleaner body according to an embodiment of the present invention.
Figure 2:
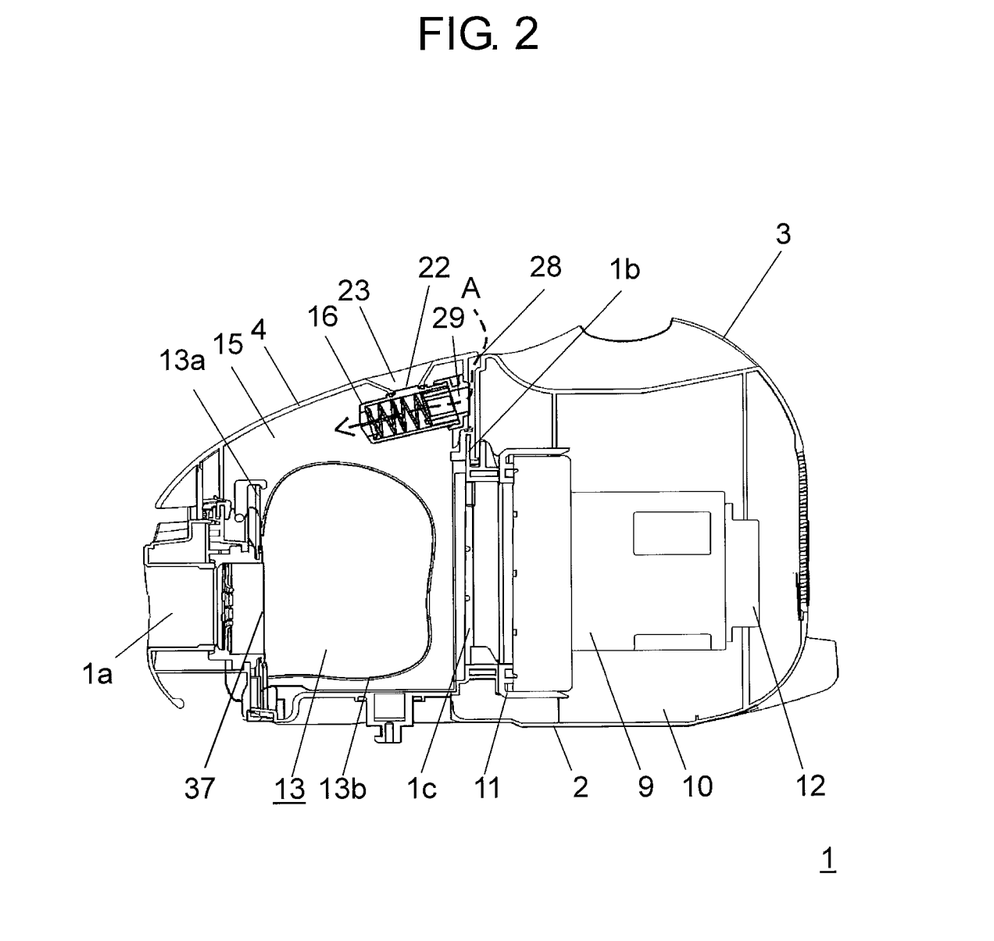
FIG. 2 is a cross-sectional principal-part configuration view of a vacuum cleaner body which is used with a dust collecting bag being attached in a dust collection chamber thereof, according to a first embodiment of the invention.
Figure 3A:
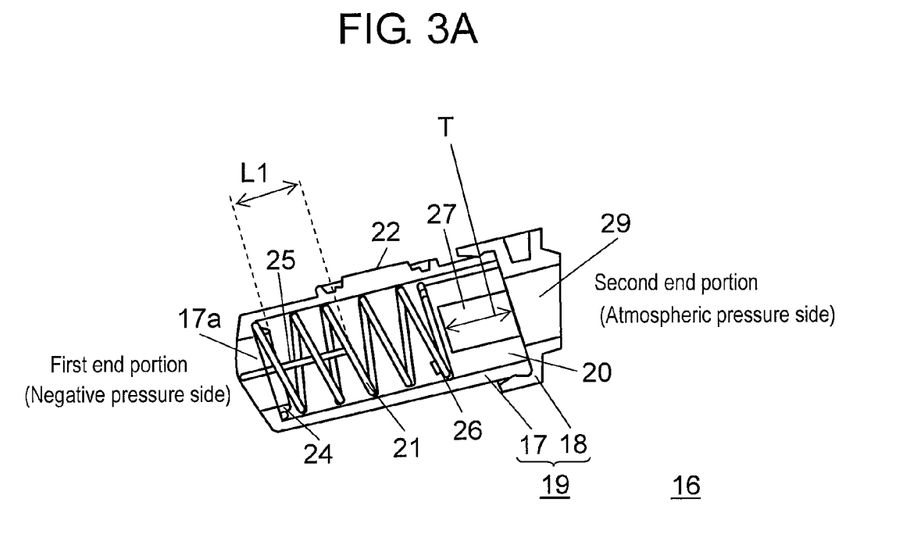
FIG. 3A is a cross-sectional principal-part configuration view illustrating a configuration of a collected-dust-amount indicating device of the vacuum cleaner body which is used with the dust collecting bag being attached in the dust collection chamber, according to the first embodiment of the invention.
Figure 3B:
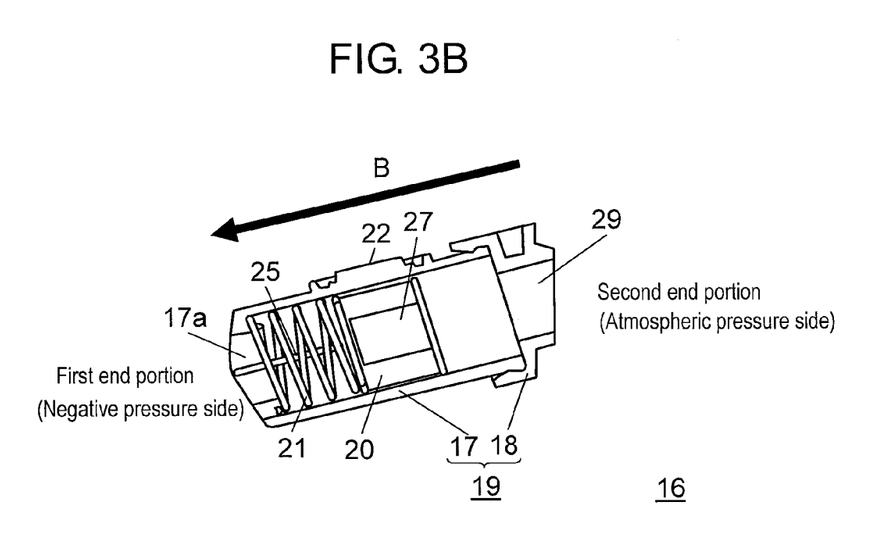
FIG. 3B is a cross-sectional principal-part configuration view illustrating the configuration of the collected-dust-amount indicating device, when a pointer works, of the vacuum cleaner body which is used with the dust collecting bag being attached in the dust collection chamber, according to the first embodiment of the invention.

FIG. 1 is a perspective view of a vacuum cleaner body according to the embodiments of the present invention. FIG. 2 is a cross-sectional principal-part configuration view of a vacuum cleaner body which is used with a dust collecting bag being attached in a dust collection chamber thereof, according to the first embodiment of the invention. Moreover, FIG. 3A is a cross-sectional principal-part configuration view illustrating a configuration of a collected-dust-amount indicating device of the vacuum cleaner body which is used with the dust collecting bag being attached in the dust collection chamber, according to the first embodiment of the invention. FIG. 3B is a cross-sectional principal-part configuration view illustrating the configuration of the collected-dust-amount indicating device, when a pointer works, of the vacuum cleaner body which is used with the dust collecting bag being attached in the dust collection chamber, according to the first embodiment of the invention.

As shown in FIGS. 1 and 2, vacuum cleaner body 1 includes: lower body case 2 that configures a lower surface of vacuum cleaner body 1; upper body case 3 that forms an upper surface of electric blower chamber 10; and lid body 4 that covers an upper surface of dust collection chamber 15. Lid body 4 is pivotally disposed, via a shaft, with respect to upper body case 3. Moreover, at a front portion of vacuum cleaner body 1, a hose (not shown) is detachably coupled with the cleaner body via suction port 1a.

At both side surfaces of a rear portion of vacuum cleaner body 1, wheels 5 for travelling are disposed. Furthermore, at a front portion of the lower surface of vacuum cleaner body 1, a caster for travelling is disposed. Each of wheels 5 and the caster is rotatably disposed to lower body case 2 via a shaft.

The rear portion of vacuum cleaner body 1 accommodates a cord reel (not shown) having power cord 6. Power cord 6 is connected to commercial power when using vacuum cleaner body 1. Moreover, at an upper portion of vacuum cleaner body 1, body handle 7 is disposed which a user uses to hold vacuum cleaner body 1 when carrying the body. Body handle 7 is secured to upper body case 3. In body handle 7, windup button 8 for winding up power cord 6 is disposed. Windup button 8 is operated by the user.

As shown in FIG. 2, at the rear portion of vacuum cleaner body 1, electric blower chamber 10 is disposed which accommodates electric blower 9. High speed rotation of electric blower 9 decreases the pressure of the inside of dust collection chamber 15. This causes the pressure of collection chamber 15 to be a negative pressure. At a front portion of electric blower 9, front supporting rubber 11 is disposed. At a rear portion of electric blower 9, rear supporting rubber 12 is disposed. Electric blower 9 is held and secured in electric blower chamber 10 by means of both front supporting rubber 11 and rear supporting rubber 12.

At the front portion of vacuum cleaner body 1, dust collection chamber 15 is disposed in which dust collecting bag 13 (FIG. 2) for collecting dust is detachably accommodated. Dust collection chamber 15 and electric blower chamber 10 are separated from each other via partition wall 1b disposed in lower body case 2. Moreover, in partition wall 1b, communication port 1c is disposed through which dust collection chamber 15 communicates with electric blower chamber 10. Moreover, in an upper portion of dust collection chamber 15, collected-dust-amount indicating device 16 is disposed for notifying the user of a timing of replacing dust collecting bag 13. Collected-dust-amount indicating device 16 is attached, with such as a screw, to lid body 4 that covers the upper surface of dust collection chamber 15 in an openable and closeable manner.

As shown in FIG. 2, dust collecting bag 13 includes collar part 13a that has suction opening A 37 communicating with suction port 1a, and bag part 13b that is attached to collar part 13a and collects the dust.

In the first embodiment, descriptions will be made for the case where collected-dust-amount indicating device 16 is used in an electric vacuum cleaner in which vacuum cleaner body 1 is used with dust collecting bag 13 being attached therein, as shown in FIG. 2.

As shown in FIGS. 2, 3A, and 3B, collected-dust-amount indicating device 16 is such that a part of the device is formed of a transparent material and a first end portion of pointer tube body 17 includes opening 17a (FIG. 3A). In pointer tube body 17, pointer valve A 18 is disposed at a second end portion, i.e. the opposite side to the first end portion. Moreover, pointer 20 is disposed inside pointer tube body 17. Pointer 20 is displaced by a differential pressure between a negative pressure, i.e. a first pressure, generated by electric blower 9 and atmospheric pressure, i.e. a second pressure. Moreover, pointer spring 21 is disposed inside pointer tube body 17. Pointer spring 21 biases pointer 20 toward the atmospheric pressure side of pointer tube 19.

In pointer tube body 17, window part 22 is disposed through which the user can visually recognize the position of pointer 20, with pointer 20 working, i.e. in a state of pointer 20 being pushing pointer spring 21.

Window part 22 is disposed in a side surface of pointer tube 19. Moreover, in the position corresponding to window part 22 of lid body 4, window hole part 23 (FIG. 2) is disposed. The configuration is such that the user can visually recognize the movement of pointer 20 with pointer 20 working, i.e. in the state of pointer 20 being pushing pointer spring 21.

As shown in FIG. 3A, in the first end portion located in the opening 17a side of pointer tube body 17, there are disposed securing rib A 24 for securing pointer spring 21 and first restriction rib 25 for restricting the position of pointer 20. Securing rib A 24 is disposed to protrude into the inside of pointer tube 19. Pointer spring 21 is coupled with securing rib A 24.

First restriction rib 25 has a plate-like shape, for example, and is disposed and extended toward the inside of pointer tube body 17. First restriction rib 25 restricts the position of pointer 20. This allows the position of pointer 20 to be restricted at any location. Moreover, securing pointer spring 21 is disposed in the first end portion side of pointer tube 19. Pointer 20 is disposed in the second end portion side of pointer tube 19.

In pointer 20, securing rib B 26 is disposed for securing pointer 20 and pointer spring 21. Securing rib B 26 is disposed to protrude toward the first end portion so as to secure pointer spring 21. Pointer spring 21 is disposed inside pointer tube body 17, with the spring being secured by securing rib A 24 and securing rib B 26. With this configuration, when assembling collected-dust-amount indicating device 16, the assembling can be performed with pointer spring 21 being temporarily fixed to pointer 20, which allows easy assembling. Moreover, this allows stable operation of pointer 20 as well as the easy assembling of collected-dust-amount indicating device 16.

Pointer 20 has a cylinder shape, for example, and includes recess 27. Pointer 20 includes recess 27 having a blind-hole shape with a length in the direction parallel to the sliding direction of pointer 20. In pointer 20, recess 27 is disposed in the surface opposite to the surface on which securing rib B 26 is disposed. In recess 27, length T (FIG. 3A) of recess 27 represents the length in the direction parallel to the sliding direction of pointer 20.

Length L1 (FIG. 3A) of first restriction rib 25 represents the length from the tip portion of first restriction rib 25 to the tip portion of securing rib A 24. Length L1 of first restriction rib 25 is one within which the position of pointer 20 can be restricted. Pointer 20 is restricted, by first restriction rib 25, at the position at which at least a part of pointer 20 overlaps with window part 22 in the direction perpendicular to the sliding direction of pointer 20, with pointer spring 21 being pushed by pointer 20.

Figure 5A:
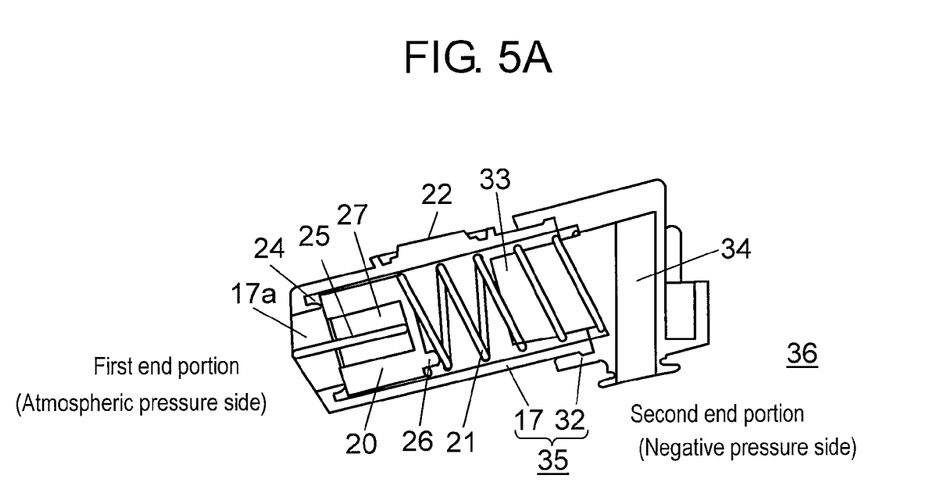
FIG. 5A is a cross-sectional principal-part configuration view illustrating a collected-dust-amount indicating device of the vacuum cleaner body which is used with the dust collecting box being attached in the dust collection chamber, according to the second embodiment of the invention.

Length L1 of first restriction rib 25 is formed not to be larger than depth T (FIG. 3A) of recess 27; details of this configuration will be described in a second embodiment. The configuration is useful when pointer 20 and first restriction rib 25 are configured in the directions facing each other (FIG. 5A). With this configuration, pointer 20 is capable of being attached at any appropriate position without touching first restriction rib 25, because of the presence of recess 27.

In pointer valve A 18, communication passage A 29 is disposed. Communication passage A 29 is disposed through which hole part 28 (FIG. 2) communicates with the inside of pointer tube body 17 (FIG. 3A) when collected-dust-amount indicating device 16 is attached to lid body 4. Hole part 28 is formed between lid body 4 and upper body case 3.

As shown in FIG. 2, in vacuum cleaner body 1 that is used with dust collecting bag 13 being attached therein, collected-dust-amount indicating device 16 is attached in dust collection chamber 15. Pointer tube body 17 (FIG. 3A) is disposed such that the inside of the tube body communicates with communication passage A 29 of pointer valve A 18. The inside of pointer tube body 17 (FIG. 3A) communicates with outside air via communication passage A 29. Moreover, the inside of pointer tube body 17 communicates with dust collection chamber 15 via opening 17a of pointer tube body 17. With this state, the user starts the operation of vacuum cleaner body 1.

Upon starting the operation of vacuum cleaner body 1, electric blower 9 inside electric blower 9 rotates at high speed to cause a negative pressure of the inside of dust collection chamber 15. The first pressure is applied to the first end portion at which opening 17a of collected-dust-amount indicating device 16 is located. The second pressure is applied to the second end portion located in the direction of pointer valve A 18 of collected-dust-amount indicating device 16. Here, in the first embodiment, the first pressure is the negative pressure, while the second pressure is the atmospheric pressure.

As shown in FIGS. 2, 3A, and 3B, in collected-dust-amount indicating device 16, pointer 20 and pointer spring 21 are disposed in the inside of pointer tube body 17, in the order of pointer spring 21 and pointer 20 starting from the first end portion side in which opening 17a of pointer tube body 17 is disposed. Pointer valve A 18 is configured to be attached to the second end portion side located opposite to opening 17a of pointer tube body 17.

Hereinafter, operations and functions of thus-configured collected-dust-amount indicating device 16 will be described.

As shown in FIGS. 2 and 3A, in the state of electric blower 9 of vacuum cleaner body 1 being not operated, collected-dust-amount indicating device 16 is such that pointer spring 21 biases pointer 20 toward the second end portion at which pointer valve A 18 is attached. Collected-dust-amount indicating device 16 is disposed to lid body 4 configuring the upper surface of dust collection chamber 15, in the state where pointer 20 is in contact with pointer valve A 18.

When the user starts to operate vacuum cleaner body 1, electric blower 9 generates a suction air. The dust on a surface to be cleaned flows into the inside of vacuum cleaner body 1 via a suction tool (not shown) coupled with vacuum cleaner body 1, an extension pipe (not shown), and a hose (not shown). Then, the dust is collected in dust collecting bag 13.

The suction air, after the dust has been collected in dust collecting bag 13, passes through communication port 1c of partition wall 1b disposed in lower body case 2, and flows into electric blower chamber 10. The air that flows into electric blower chamber 10 is exhausted to the outside of vacuum cleaner body 1, from an air exhaust port (not shown) disposed in the rear portion of vacuum cleaner body 1.

When electric blower 9 rotates, the negative pressure is applied to the first end portion side, in which opening 17a is disposed, of collected-dust-amount indicating device 16.

The rotation of electric blower 9 causes the air containing the dust to flow into dust collecting bag 13. The dust is accumulated in the inside of dust collecting bag 13. Increasing of the amount of the dust accumulated inside dust collecting bag 13 reduces the flow rate of the air flowing into electric blower 9 from suction opening A 37. The pressure of the inside of dust collection chamber 15 gradually decreases with increasing amount of the dust accumulated inside dust collecting bag 13. For this reason, the negative pressure becomes greater which is the first pressure applied to the first end portion side, in which opening 17a is disposed, of collected-dust-amount indicating device 16.

Here, in FIG. 2, arrow A indicates the flow of the air, which is suctioned from hole part 28, flowing into the inside of dust collection chamber 15. Collected-dust-amount indicating device 16 is such that pointer valve A 18 communicates with hole part 28 via communication passage A 29. Pointer tube body 17 (FIG. 3A) communicates with dust collection chamber 15 via opening 17a. Accordingly, the air suctioned from hole part 28 passes through communication passage A 29, the inside of pointer tube body 17, and opening 17a of pointer tube body 17 to flow into the inside of dust collection chamber 15. For this reason, the negative pressure is applied to the first end portion side, while the atmospheric pressure is applied to the second end portion side in which pointer valve A 18 of collected-dust-amount indicating device 16 is disposed.

When the amount of the dust accumulated inside dust collecting bag 13 increases to a certain amount or more, the differential pressure becomes a certain value or more which is a difference in pressure between the negative pressure applied to the first end portion side and the atmospheric pressure applied to the second end portion side. Then, when the differential pressure becomes the certain value or more, the suction force that attracts pointer 20 toward the negative pressure side (the first end portion side in which opening 17*a* is disposed) becomes larger than the bias force caused by pointer spring 21. For this reason, pointer 20 moves toward the first end portion, i.e. in the direction indicated by arrow B of FIG. 3B.

As shown in FIG. 3B, pointer 20 that moves toward the first end portion (in the direction of arrow B of FIG. 3B) located in the direction toward opening 17*a* of collected-dust-amount indicating device 16, comes in contact with first restriction rib 25. The position of pointer 20 is restricted by first restriction rib 25, in the inside of pointer tube 19. Pointer 20 is restricted at the position at which at least the part of pointer 20 overlaps with window part 22, in the direction perpendicular to the sliding direction of pointer 20, with pointer spring 21 being pushed by pointer 20. That is, pointer 20 stops moving at the position at which the part of pointer 20 overlaps with window part 22 in the direction perpendicular to the sliding direction of pointer 20 of pointer tube 19.

The user determines the timing of replacing dust collecting bag 13 by visually observing window part 22 through window hole part 23 of lid body 4. When pointer 20 can be visually observed through window hole part 23, it is determined that the timing of replacing dust collecting bag 13 comes, and then dust collecting bag 13 is replaced. With this operation, it is possible to use vacuum cleaner body 1 again with strong suctioning.

In the first embodiment, in opening 17*a* of pointer tube body 17, securing rib A 24 is disposed to secure pointer spring 21. Moreover, in pointer 20, securing rib B 26 is disposed to secure pointer spring 21. This configuration allows reliable operation of pointer spring 21 as well as easy assembling of collected-dust-amount indicating device 16.

In the first embodiment, the descriptions have been made for the case where collected-dust-amount indicating device 16 is disposed in vacuum cleaner body 1 that is used with dust collecting bag 13 being attached therein. However, without being limited to these cases, it is possible to use collected-dust-amount indicating device 16 by changing the attachment positions of the components thereof even in the case where the pressures applied to the first end portion and the second end portion of collected-dust-amount indicating device 16 are changed; details of this will be described in the second embodiment. Accordingly, it is possible to provide commonality of the components of collected-dust-amount indicating device 16 among electric vacuum cleaners which differ from each other in dust collecting systems of the cleaners, appearance configurations of the cleaner bodies, arrangement positions of the collected-dust-amount indicating devices, and the like. This allows a reduction in manufacturing costs of the electric vacuum cleaners.

Second Exemplary Embodiment

Next, descriptions will be made of a configuration of collected-dust-amount indicating device 36 according to a second embodiment, in the case where collected-dust-amount indicating device 36 is attached in dust collection chamber 15 of vacuum cleaner body 1 that is used with dust collecting box 14 being attached in the chamber. Note that the components having the same configurations as those in the first embodiment are designated by the same reference numerals, and the descriptions thereof are omitted.

Figure 4:
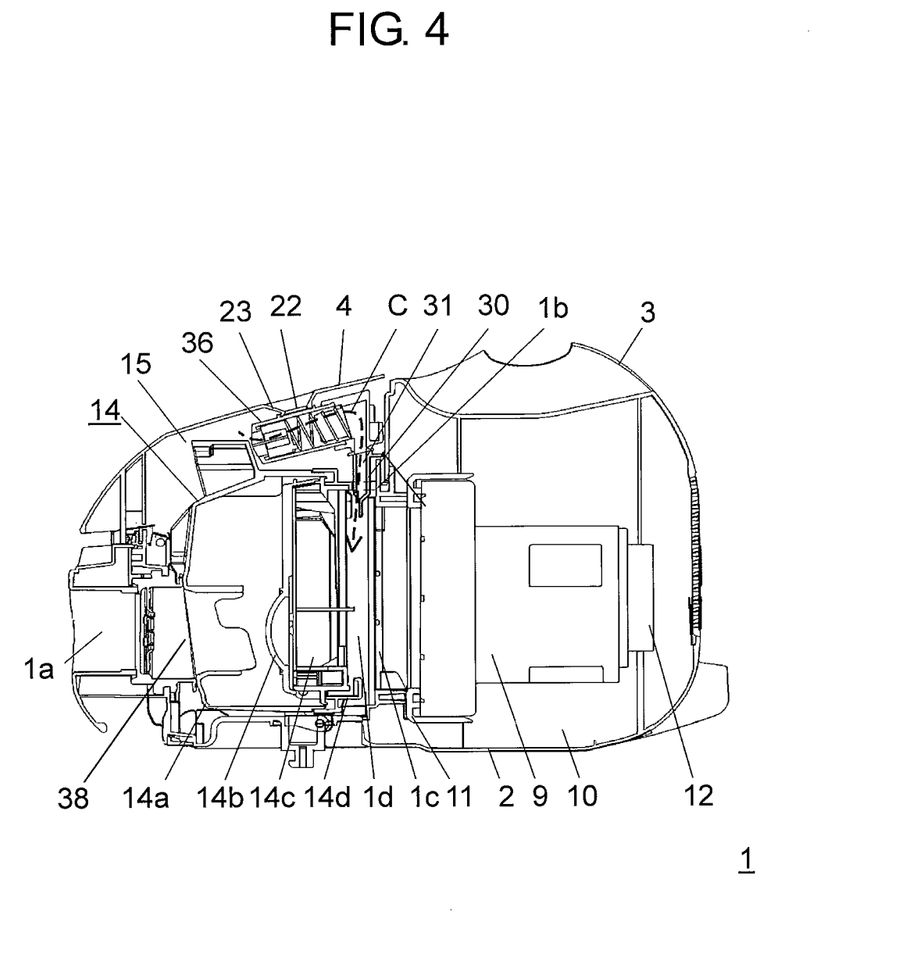
FIG. 4 is a cross-sectional principal-part configuration view of a vacuum cleaner body which is used with a dust collecting box being attached in a dust collection chamber thereof, according to a second embodiment of the invention.
Figure 5B:
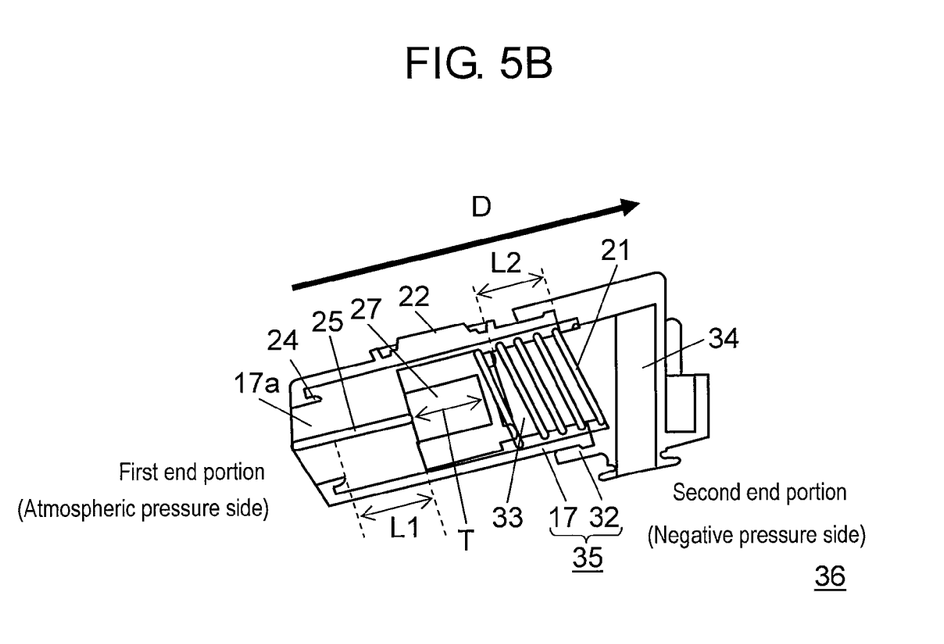
FIG. 5B is a cross-sectional principal-part configuration view illustrating a configuration of the collected-dust-amount indicating device, when a pointer works, of the vacuum cleaner body which is used with the dust collecting box being attached in the dust collection chamber, according to the second embodiment of the invention.

The configuration of the vacuum cleaner body is the same as that shown in FIG. 1. FIG. 4 is a cross-sectional principal-part configuration view of vacuum cleaner body 1 that is used with dust collecting box 14 being attached in dust collection chamber 15, according to the second embodiment of the present invention. FIG. 5A is a cross-sectional principal-part configuration view illustrating collected-dust-amount indicating device 36 of vacuum cleaner body 1 that is used with dust collecting box 14 being attached in dust collection chamber 15, according to the second embodiment of the invention. FIG. 5B is a cross-sectional principal-part configuration view illustrating a configuration of collected-dust-amount indicating device 36, when pointer 20 works, of vacuum cleaner body 1 that is used with dust collecting box 14 being attached in dust collection chamber 15, according to the second embodiment of the invention.

In FIG. 4, collected-dust-amount indicating device 36 includes dust-collecting box body 14*a* for accumulating dust, primary filter 14*b*, secondary filter 14*c*, and lid part 14*d*. Primary filter 14*b* is disposed downstream of dust-collecting box body 14*a*, for collecting coarse dust. Secondary filter 14*c* collects fine dust that has passed through primary filter 14*b*. Lid part 14*d* includes secondary filter 14*c*.

In FIG. 4, seal part 30 is disposed to provide airtight (hermetic) sealing between dust collecting box 14 and lower body case 2, in the rear portion of dust collecting box 14. Communication port 1*c* is formed with partition wall 1*b* that is disposed in lower body case 2. Seal part 30 is configured with a gasket (not shown) that is disposed to cover the outer periphery of communication port 1*c*. With seal part 30, suction air passage 1*d* is formed which is separated from dust collection chamber 15. Suction air passage 1*d* forms an air passage through which a suction air exhausted from dust collecting box 14 passes to reach electric blower chamber 10. In seal part 30, air communication passage 31 (FIG. 4) is disposed through which suction air passage 1*d* (FIG. 4) communicates with communication passage B 34 (FIG. 5A) of collected-dust-amount indicating device 36 that is to be described later. As shown in FIG. 5A, communication passage B 34 is disposed in pointer valve B 32.

As shown in FIGS. 4 and 5A, pointer tube 35 includes pointer tube body 17, and pointer valve B 32 disposed in the second end portion side of pointer tube body 17, with the pointer valve B having communication passage B 34 that communicates with the inside of pointer tube body 17. Communication passage B 34 has a length in the direction approximately perpendicular to the sliding direction of pointer 20. Pointer 20 and pointer spring 21 are disposed in the inside of pointer tube body 17, in the order of pointer 20 and pointer spring 21 starting from the first end portion side in which opening 17*a* of pointer tube body 17 is disposed. Pointer valve B 32 is configured to be attached to the second end portion side located opposite to opening 17*a* of pointer tube body 17.

Pointer valve B 32 includes second restriction rib 33. Second restriction rib 33 is disposed and extended toward the inside of pointer tube body 17 from pointer valve B 32. Pointer spring 21 is disposed in the inside of pointer tube body 17, in the state where the spring is in contact with both securing rib B 26 and second restriction rib 33. Second restriction rib 33 secures pointer spring 21. With this configuration, second restriction rib 33 stops the movement of pointer 20 with pointer 20 working, i.e. in a state of pointer 20 being pushing pointer spring 21.

Moreover, as shown in FIG. 5B, pointer 20 includes recess 27 having a blind-hole shape with a length in the direction parallel to the sliding direction of pointer 20. In pointer 20, recess 27 is disposed in the surface opposite to the surface on which securing rib B 26 is disposed. In recess 27, length T (FIG. 5B) of recess 27 represents the length in the direction parallel to the sliding direction of pointer 20.

Length L1 (FIG. 5B) of first restriction rib 25 represents the length from the tip portion of first restriction rib 25 to the tip portion of securing rib A 24. Length L1 of first restriction rib 25 is one within which the position of pointer 20 can be restricted. Pointer 20 is restricted, by first restriction rib 25, at the position at which at least a part of pointer 20 overlaps with window part 22 in the direction perpendicular to the sliding direction of pointer 20, with pointer spring 21 being pushed by pointer 20.

Length L1 from the tip portion of first restriction rib 25 to the tip portion of securing rib A 24 is formed to be not larger than depth T (FIG. 5B) of recess 27. The configuration is useful when pointer 20 and first restriction rib 25 are configured in the directions facing each other (FIG. 5A). With this configuration, since pointer 20 includes recess 27, pointer 20 stops moving at an appropriate position at which at least the part of pointer 20 overlaps with window part 22 in the direction perpendicular to the sliding direction of pointer 20 of pointer tube 35.

Length L2 of second restriction rib 33 represents the length from the tip portion of second restriction rib 33 to the position of second restriction rib 33 with the position corresponding to the end portion of pointer tube body 17. The position of pointer 20 is restricted by second restriction rib 33 in the inside of pointer tube 35. Pointer 20 is restricted at the position at which at least the part of pointer 20 overlaps with window part 22 in the direction perpendicular to the sliding direction of pointer 20, with pointer spring 21 being pushed by pointer 20. That is, pointer 20 stops moving at the position at which the at least the part of pointer 20 overlaps with window part 22 in the direction perpendicular to the sliding direction of pointer 20 of pointer tube 35.

Moreover, in pointer valve B 32, communication passage B 34 is disposed through which air communication passage 31 communicates with the inside of pointer tube body 17. Collected-dust-amount indicating device 36 is disposed at the position at which air communication passage 31 communicates with communication passage B 34 when lid body 4 (FIG. 4) is closed. Moreover, pointer valve B 32 is formed of a soft material, such as rubber, with high adhesiveness in order to hold airtightness between air communication passage 31 and communication passage B 34.

As shown in FIG. 4, in vacuum cleaner body 1 that is used with dust collecting box 14 being attached, collected-dust-amount indicating device 36 is attached in dust collection chamber 15. The inside of pointer tube body 17 (FIG. 5A) communicates with dust collection chamber 15 via opening 17a of pointer tube body 17. Moreover, the inside of pointer tube body 17 communicates with air communication passage 31 via communication passage B 34 of pointer valve B 32.

When a user starts to operate vacuum cleaner body 1, a negative pressure is generated by an electric blower, resulting in a negative pressure of air communication passage 31. Atmospheric pressure, i.e. a first pressure, is applied to the first end portion side, in which opening 17a is disposed, of collected-dust-amount indicating device 36. Moreover, the negative pressure, i.e. a second pressure, is applied to the second end portion side, in the direction toward pointer valve B 32, of collected-dust-amount indicating device 36.

In the first embodiment described earlier, the configuration is such that vacuum cleaner body 1 is used with dust collecting bag 13 being attached. In the first embodiment, the first pressure is the negative pressure. In contrast, in the second embodiment, the first pressure is the atmospheric pressure which is applied to the side, i.e. the first end portion side in which opening 17a of pointer tube body 17 is disposed. Moreover, in the first embodiment, the second pressure applied to the second end portion side located in the direction toward pointer valve A 18, is the atmospheric pressure. In contrast, in the second embodiment, the second pressure is the negative pressure. This is because the pressures applied to the first end portion and the second end portion are changed, resulting from the configuration of vacuum cleaner body 1 concerning the attachment of collected-dust-amount indicating device 36. Even when the pressures are changed which are applied to the first end portion side and the second end portion side of pointer tube 35, use of either collected-dust-amount indicating device 16 or collected-dust-amount indicating device 36 is possible by changing the attachment positions of pointer 20 and pointer spring 21.

Descriptions will be made of the configuration in which collected-dust-amount indicating device 36 is attached in dust collection chamber 15, in vacuum cleaner body 1 that is used with dust collecting box 14 being attached, as shown in FIGS. 4 and 5A. Collected-dust-amount indicating device 36 is such that pointer 20 and pointer spring 21 are disposed inside pointer tube body 17, in this order starting from the first end portion side in which opening 17a of pointer tube body 17 is disposed. The configuration is such that pointer valve B 32 is attached to the second end portion side opposite to the end portion, at which opening 17a is located, of pointer tube body 17.

Hereinafter, operations and functions of thus-configured collected-dust-amount indicating device 36 will be described.

As shown in FIGS. 4 and 5A, in the state where electric blower 9 inside vacuum cleaner body 1 is not operated, collected-dust-amount indicating device 36 is such that pointer 20 is biased toward the first end portion, i.e. opening 17a, by pointer spring 21. Collected-dust-amount indicating device 36 is disposed to lid body 4 that configures the upper surface of dust collection chamber 15, in the state where pointer 20 is in contact with the first end portion at which opening 17a of pointer tube body 17 is disposed. In the state where vacuum cleaner body 1 is not operated, the first pressure applied to the first end portion side is the atmospheric pressure, and also the second pressure applied to the second end portion side is the atmospheric pressure.

When the user starts to operate vacuum cleaner body 1, electric blower 9 generates the suction air which conducts dust on a surface to be cleaned into the inside of vacuum cleaner body 1 via a suction tool (not shown) coupled with vacuum cleaner body 1, an extension pipe (not shown), and a hose (not shown). After that, the dust flows into the inside of dust collecting box 14. The dust flowing into the inside of dust collecting box 14 is collected by primary filter 14b and secondary filter 14c. The dust is accumulated inside dust collecting box 14, and only the suction air is exhausted to the outside of dust collecting box 14. The suction air exhausted from dust collecting box 14 passes through suction air passage 1d that is formed with seal part 30. Seal part 30 is disposed in the rear portion of dust collecting box 14. Moreover, the suction air passes through communication port 1c of partition wall 1b disposed in lower body case 2, and then flows into electric blower chamber 10. Then, the suction air is exhausted to the outside of vacuum cleaner body 1 from an air exhaust port (not shown) disposed in the rear portion of vacuum cleaner body 1.

Upon rotation of electric blower 9, the negative pressure is applied, as the second pressure, to the second end portion side, i.e. the pointer valve B 32 (FIG. 5A) side of collected-dust-amount indicating device 36. Air containing dust flows into dust collecting box 14. The dust is accumulated in the inside of dust collecting box 14. Increasing of the amount of the dust accumulated in the inside of dust collecting box 14 reduces the flow rate of the air flowing into electric blower 9. This results in a gradual decrease in the pressures of the inside of dust collecting box 14 and the inside of suction air passage 1d. Then, the negative pressure becomes greater which is the second pressure applied to the second end portion side, i.e. the pointer valve B 32 (FIG. 5A) side of collected-dust-amount indicating device 36.

Here, in FIG. 4, arrow C indicates the flow of the air that flows from the inside of dust collection chamber 15 into collected-dust-amount indicating device 36. Collected-dust-amount indicating device 36 is such that communication passage B 34 of pointer valve B 32 communicates with suction air passage 1d via air communication passage 31. Moreover, pointer tube body 17 communicates with dust collection chamber 15 via opening 17a. Therefore, the air suctioned from dust collection chamber 15 flows into the inside of suction air passage 1d (FIG. 4) via opening 17a of pointer tube body 17, the inside of pointer tube body 17, communication passage B 34 (FIG. 5A), and air communication passage 31 (FIG. 4). For this reason, the atmospheric pressure is applied to the first end portion side, in the direction of opening 17a, of collected-dust-amount indicating device 36. Moreover, the negative pressure is applied to the second end portion side, in which pointer valve B 32 is disposed, of collected-dust-amount indicating device 36.

When the amount of the dust accumulated inside dust collecting box 14 increases to be a certain amount or more, a difference in pressure becomes a certain value or more, which is between the negative pressure, i.e. the second pressure applied to the second end portion side and the atmospheric pressure, i.e. the first pressure applied to the first end portion side. Then, as shown in FIG. 5B, when the differential pressure becomes a certain value or more, a suction force is raised which attracts pointer 20 toward the negative pressure side (the pointer valve B 32 side). The suction force acting on pointer 20 becomes greater than the bias force caused by pointer spring 21. Accordingly, pointer 20 moves toward pointer valve B 32, i.e. in the direction indicated by arrow D of FIG. 5B.

As shown in FIG. 5B, pointer 20 that has moved toward pointer valve B 32 (in the direction indicated by arrow D of FIG. 5B) of collected-dust-amount indicating device 36 is in contact with second restriction rib 33. Pointer 20 stops moving at the position at which at least the part of pointer 20 overlaps with window part 22 in the direction perpendicular to the sliding direction of pointer 20, in a state of pointer spring 21 being pushed by pointer 20. Then, the user visually observes window part 22 through window hole part 23 of lid body 4. When pointer 20 can be visually observed through window part 22, it is determined that a timing of disposing of the dust in dust collecting box 14 comes. Then, the user disposes of the dust in dust collecting box 14. With this operation, it is possible to use vacuum cleaner body 1 again with strong suctioning.

As described above, in the second embodiment, the descriptions have been made concerning vacuum cleaner body 1 that is used with dust collecting box 14 being attached. Collected-dust-amount indicating device 16 and collected-dust-amount indicating device 36 are different from each other in the configurations of their respective valves, i.e. pointer valve A 18 and pointer valve B 32. Moreover, in collected-dust-amount indicating device 36, it is possible to optionally select the positions of the second end portion side to which the negative pressure is applied and the first end portion side to which the atmospheric pressure is applied, by changing the order in which pointer 20 and pointer spring 21 are attached. That is, as described in the first embodiment and in the second embodiment, even when the pressures are changed which are applied to the first end portion side and the second end portion side of each of pointer tube 19 and pointer tube 35, it is possible to use collected-dust-amount indicating device 16 and collected-dust-amount indicating device 36, by changing the attachment positions of pointer 20 and pointer spring 21. Accordingly, it is possible to provide commonality of the components of collected-dust-amount indicating device 36 among electric vacuum cleaners which differ from each other in dust collecting systems of the cleaners, appearance configurations of the cleaner bodies, arrangement positions of collected-dust-amount indicating device 16 and collected-dust-amount indicating device 36, and the like. This allows a reduction in manufacturing costs of the electric vacuum cleaners.

Moreover, in the first embodiment and the second embodiment, it is configured that the length of recess 27 in the direction parallel to the sliding direction of pointer 20 is not smaller than the length of first restriction rib 25 in the direction parallel to the sliding direction of pointer 20. With this configuration, the pointer stops moving at which at least the part of pointer 20 overlaps with the window part in the direction perpendicular to the sliding direction of pointer 20, in the state of pointer spring 21 being pushed by pointer 20. Therefore, the position of pointer 20 can be visually observed through window part 22.

Furthermore, in pointer 20, securing rib B 26 is disposed for securing pointer spring 21. FIG. 5A shows the configuration in which collected-dust-amount indicating device 36 is disposed in vacuum cleaner body 1 that is used with dust collecting box 14 being attached therein. In this case, pointer 20 is biased toward the first end portion in which opening 17a is disposed, by pointer spring 21. Even when pointer 20 is in contact with the end portion of the first end portion side, in which opening 17a is disposed, of pointer tube body 17, it is possible to correctly set pointer 20 because recess 27 faces first restriction rib 25. Collected-dust-amount indicating device 16 and collected-dust-amount indicating device 36 are different from each other in the configurations of their respective valves, i.e. pointer valve A 18 and pointer valve B 32; therefore, the order in which pointer 20 and pointer spring 21 are attached is changed. Accordingly, it is possible to provide the commonality of the components between collected-dust-amount indicating device 16 and collected-dust-amount indicating device 36. This allows a reduction in manufacturing costs of the electric vacuum cleaners.

Moreover, in the first embodiment, securing rib A 24 for securing pointer spring 21 is disposed to opening 17a of pointer tube body 17. Furthermore, in the second embodiment, securing rib B 26 for securing pointer spring 21 is disposed to pointer 20. In addition, second restriction rib 33 for securing pointer spring 21 is disposed to pointer valve B 32. This configuration allows reliable operation of pointer spring 21 as well as easy assembling of collected-dust-amount indicating device 36.

In addition, in the second embodiment, pointer valve B 32 is formed of a material with high adhesiveness. This allows collected-dust-amount indicating device 36 to provide a reliable holding of the airtightness between air communication passage 31 and communication passage B 34, in vacuum cleaner body 1 that is used with dust collecting box 14 being attached. With this configuration, there is no leakage of the air flowing into collected-dust-amount indicating device 36, resulting in improved operation accuracy of pointer 20. In addition, no leakage of the air results in stable operation of pointer 20.

Here, in the first embodiment, the descriptions have been made in the case where collected-dust-amount indicating device 16 is disposed in vacuum cleaner body 1 that is used with dust collecting bag 13 being attached therein. Moreover, in the second embodiment, the descriptions have been made in the case where collected-dust-amount indicating device 36 is disposed in vacuum cleaner body 1 that is used with dust collecting box 14 being attached therein. Without being limited to these two cases, it is only required for collected-dust-amount indicating device 36 to be disposed such that the negative pressure is applied to one end portion of collected-dust-amount indicating device 36 and the atmospheric pressure is applied to the opposed end portion thereof. For example, a flow passage may be formed to be separated from electric blower chamber 10 by means of such as a gasket. The flow passage is one through which the suction air exhausted from either dust collecting bag 13 or dust collecting box 14 flows to reach electric blower 9 via the rear portion of communication port 1c of partition wall 1b. Moreover, collected-dust-amount indicating device 36 may be disposed to upper body case 3 which configures the upper surface of electric blower chamber 10, such that one end portion of collected-dust-amount indicating device 36 communicates with the flow passage and the other end portion communicates with electric blower chamber 10.

With this configuration, it is possible to change the arrangement location of collected-dust-amount indicating device 36. Accordingly, it is possible to provide the commonality of the components of collected-dust-amount indicating device 36 among electric vacuum cleaners which differ from each other in the dust collecting systems of the cleaners, the appearance configurations of the cleaner bodies, the arrangement positions of collected-dust-amount indicating devices, and the like. This allows a reduction in manufacturing costs of the electric vacuum cleaners.

As described above, collected-dust-amount indicating device 16 in the first embodiment and collected-dust-amount indicating device 36 in the second embodiment are different from each other in the configurations of their respective valves, i.e. pointer valve A 18 and pointer valve B 32. Moreover, in pointer tube 19 of collected-dust-amount indicating device 16 and in pointer tube 35 of collected-dust-amount indicating device 36, the order in which pointer 20 and pointer spring 21 are attached is changed. Specifically, in collected-dust-amount indicating device 16 in the first embodiment, pointer spring 21 and pointer 20 are disposed in the first end portion side and the second end portion side, respectively. In contrast, in collected-dust-amount indicating device 36 in the second embodiment, pointer 20 and pointer spring 21 are disposed in the first end portion side and the second end portion side, respectively. Accordingly, it is possible to provide the commonality of the components between collected-dust-amount indicating device 16 and collected-dust-amount indicating device 36. Therefore, it is possible to change the pressures applied to the first end portion side and the second end portion side of pointer tube 19, by changing the attachment positions of pointer 20 and pointer spring 21.

Moreover, in the second embodiment, the descriptions have been made concerning the configuration in which length L2 of second restriction rib 33, as well as length L1 of first restriction rib 25, is restricted at the position at which at least the part of pointer 20 overlaps with window part 22 in the direction perpendicular to the sliding direction of pointer 20, with pointer 20 working, i.e. in the state of pointer 20 being pushing pointer spring 21. As long as this configuration holds, length L2 may be formed to be not larger than depth T of recess 27.

The same configuration may be employed in pointer valve A 18 of collected-dust-amount indicating device 16 according to the first embodiment, and in pointer valve B 32 of collected-dust-amount indicating device 36 according to the second embodiment. Without changing the configurations of the pointer valves (pointer valve A 18 and pointer valve B 32), the order in which pointer 20 and pointer spring 21 are attached is changed. With this configuration, it is possible to provide the commonality of the components of collected-dust-amount indicating device 16 between vacuum cleaner body 1 that is used with dust collecting bag 13 being attached and vacuum cleaner body 1 that is used with dust collecting box 14 being attached. For this reason, it is possible to further reduce the manufacturing costs of the electric vacuum cleaners.

INDUSTRIAL APPLICABILITY

The present invention can provide the collected-dust-amount indicating device and the electric vacuum cleaner equipped with the device, which are capable of providing commonality of the components of the collected-dust-amount indicating device among electric vacuum cleaners different from each other in dust collecting systems of the cleaners, appearance configurations of the cleaner bodies, arrangement positions of the devices, and the like. This allows reduced manufacturing costs of the electric vacuum cleaners. Consequently, the invention is useful for home-use electric vacuum cleaners and industrial electric vacuum cleaners, which are equipped with the collected-dust-amount indicating devices.

The invention claimed is:

1. A collected-dust-amount indicating device, comprising:
    a pointer tube including:
        a first end portion to which a first pressure is applied; and
        a second end portion to which a second pressure is applied, at least a part of the pointer tube being configured with a transparent material;
    a window part disposed in a side surface of the pointer tube;
    a pointer disposed in the pointer tube, the pointer being displaced by a differential pressure between the first pressure and the second pressure; and
    a pointer spring disposed in the pointer tube, the pointer spring biasing the pointer toward larger one of the first pressure and the second pressure,
    wherein the pointer tube is configured to facilitate insertion of the pointer at either one of the first end portion and the second end portion and the pointer spring at the other one of the first end portion and the second end portion, wherein when the pointer is disposed at the second end and the pointer spring is disposed at the first end, the device facilitates providing a pressure indication when the first pressure is lower than the second pressure, and when the pointer is disposed at the first end and the pointer spring is disposed at the second end, the device facilitates providing a pressure indication when the second pressure is lower than the first pressure.

2. The collected-dust-amount indicating device according to claim 1, wherein
a first restriction rib is disposed in the first end portion and restricts a position of the pointer when the pointer works,
the pointer spring is disposed in the first end portion, the pointer is disposed in the second end portion, and
the first restriction rib restricts the position of the pointer at a position in which at least a part of the pointer overlaps with the window part in a direction perpendicular to a sliding direction of the pointer, with the pointer spring being pushed by the pointer.

3. The collected-dust-amount indicating device according to claim 2, wherein a recess is disposed in the pointer, and
a length of the recess in a direction parallel to the sliding direction of the pointer is not smaller than a length of the first restriction rib in the direction parallel to the sliding direction of the pointer.

4. The collected-dust-amount indicating device according to claim 2, wherein
the pointer is disposed in the first end portion,
the pointer spring is disposed in the second end portion, and
a second restriction rib accommodated in the second end portion of the pointer tube is further included at a position where at least a part of the pointer overlaps with the window part in a direction perpendicular to the sliding direction of the pointer, with the pointer spring being pushed by the pointer.

5. The collected-dust-amount indicating device according to claim 4, wherein the pointer tube includes:
a pointer tube body, at least a part of the pointer tube body being formed with a transparent material; and
a pointer valve disposed in the second end portion of the pointer tube body, the pointer valve having a communication passage communicating with an inside of the pointer tube body, and
the communication passage has a length in the direction perpendicular to the sliding direction of the pointer.

6. The collected-dust-amount indicating device according to claim 5, wherein the second restriction rib is disposed to the pointer valve.

7. The collected-dust-amount indicating device according to claim 5, wherein the pointer valve is formed with a material with high adhesiveness.

8. The collected-dust-amount indicating device according to claim 1, wherein a securing rib for securing the pointer spring is disposed to the pointer.

9. An electric vacuum cleaner, comprising:
an electric blower for generating a negative pressure; and
the collected-dust-amount indicating device according to claim 1.

* * * * *